United States Patent [19]

Matsuda

[11] Patent Number: 5,217,287
[45] Date of Patent: Jun. 8, 1993

[54] BRAKE CONTROL SYSTEM FOR PREVENTING REAR WHEEL LOCK IN AUTOMOTIVE VEHICLES

[75] Inventor: Toshiro Matsuda, Kanagawa, Japan

[73] Assignee: Nissan Motor Co. Ltd., Yokohama, Japan

[21] Appl. No.: 802,296

[22] Filed: Dec. 4, 1991

[30] Foreign Application Priority Data

Dec. 21, 1990 [JP]  Japan .................................. 2-412735

[51] Int. Cl.$^5$ ............................................. B60T 8/28
[52] U.S. Cl. ............................ 303/113.5; 303/9.67; 303/24.1
[58] Field of Search ..................... 303/9.62, 9.67, 9.73, 303/24.1, 97, 104, 105, 107, 113 AP

[56] References Cited

U.S. PATENT DOCUMENTS

| | | | |
|---|---|---|---|
| 3,871,713 | 3/1975 | Lister | 303/113 AP |
| 4,943,123 | 7/1990 | Takeda et al. | 303/113 AP |
| 5,021,957 | 6/1991 | Yoshino et al. | 303/97 X |

FOREIGN PATENT DOCUMENTS

| | | | |
|---|---|---|---|
| 3222729 | 12/1983 | Fed. Rep. of Germany | 303/9.67 |
| 3828437 | 3/1990 | Fed. Rep. of Germany | 303/9.67 |
| 95959 | 4/1989 | Japan | 303/113 AP |
| 2065251 | 6/1981 | United Kingdom | 303/9.62 |
| 2118651 | 11/1983 | United Kingdom | 303/9.62 |
| 2214585 | 9/1989 | United Kingdom | 303/113 AP |
| 8801954 | 3/1988 | World Int. Prop. O. | 303/113 AP |

Primary Examiner—Robert J. Oberleitner
Assistant Examiner—Alfred Muratori
Attorney, Agent, or Firm—Foley & Lardner

[57] ABSTRACT

A brake control system for preventing a rear-wheel lock in an automotive vehicle comprises a fluid pressure control valve controlling a brake fluid pressure distribution between front and rear wheels such that a rear wheel-cylinder brake fluid pressure is kept substantially constant in a range above a critical fluid pressure at which the brake fluid pressure distribution is essentially varied, a longitudinal acceleration sensor for monitoring a deceleration of the vehicle body, and a set of reversible motor and return spring for increasing the critical fluid pressure in accordance with an increase in the deceleration of the vehicle body only when the deceleration is increased.

5 Claims, 4 Drawing Sheets

$$PS = A \cdot \sqrt{XG}$$

BRAKE CONTROL SYSTEM FOR PREVENTING REAR WHEEL LOCK IN AUTOMOTIVE VEHICLES

BACKGROUND OF THE INVENTION

1. Field of the Invention

The present invention relates to a brake control system employing a fluid pressure control valve for controlling a brake fluid pressure distribution between front and rear wheels, and particularly to a system for preventing a rear-wheel lock in an automotive vehicle during braking.

2. Description of the Prior Disclosure

Recently, there have been developed and disclosed various brake control systems provided in conjunction with a hydraulic type brake system in an automotive vehicle for preventing a wheel-lock during braking. An anti-skid brake control system is well known as such a wheel-lock preventing device. The anti-skid brake controls systems reliably control braking forces applied to vehicle wheels independently of each other or commonly so as to prevent a wheel-lock. However, since the anti-skid brake control system is relatively expensive, the diffusion of the anti-skid brake control system is low.

Alternatively, a fluid pressure control valve employed in a fluid pressure operated brake system, such as a hydraulic type brake system is traditionally utilized as a conventional wheel-lock preventing device. The fluid pressure control valve operates to vary the brake fluid pressure distribution between front and rear wheels. As is generally known, during braking, more of the car weight is transferred to the front wheels and thus the car's weight becomes less at the rear wheels. If normal braking were continued with the front-wheel brake fluid pressure equal to the rear-wheel brake fluid pressure, the brakes could first lock the rear wheels so that the rear tires skid. As a result, the rear wheels could throw the entire car into a rear-end skid. This could result in oversteer and/or spinning on a low frictional road surface, such as wet or icy roads. For this reason, the previously noted fluid pressure control valve is employed in conjunction with the hydraulic type brake system to provide an advantageous braking action according to which front-wheel lock gets priority over rear-wheel lock so as to eliminate oversteer tendencies on turns. As indicated by a broken line of FIG. 4, it is desired that both front and rear wheel brake fluid pressures are varied in accordance with an ideal brake fluid pressure distribution characteristic curve wherein both front and rear wheels are locked simultaneously so as to provide an optimal braking efficiency.

In view of the above, as seen in a solid line corresponding to a brake fluid pressure characteristic curve a-b-c in FIG. 4, the aforementioned conventional fluid pressure control valve controls the brake fluid pressure distribution between front and rear wheels such that the rear wheel-cylinder brake fluid pressure $P_R$ is set essentially at the same value as the front wheel-cylinder brake fluid pressure $P_F$ in a relatively low fluid pressure range from a to b and held substantially constant at a lower level than the front fluid pressure in a relatively high fluid pressure range from b to c. The point b is in general referred to as a "split point". A fluid pressure $P_{50}$ corresponding to the split point b is referred to as a "critical brake fluid pressure". Particularly, the critical fluid pressure $P_{50}$ will be referred to as a "reference critical brake fluid pressure" wherein the front wheel-cylinder brake fluid pressure $P_F$ is equal to the rear wheel-cylinder fluid pressure $P_R$ and both front and rear wheels are simultaneously locked. Such a brake fluid pressure distribution achieved by the conventional fluid pressure control valve, eliminates oversteer due to a rear-wheel lock created in a relatively high fluid pressure range above the split point b. In other words, the brake fluid pressures in the front and rear wheel-cylinders are set such that the front wheel lock gets priority to the rear wheel lock to avoid oversteer tendencies of the vehicle during braking on turns.

However, in the prior-art brake control system employing the previously noted conventional fluid pressure control valve achieving a braking control according to the brake fluid pressure characteristic curve a-b-c, the rear-wheel is finally locked after the front-wheel is first locked, during quick braking or hard braking on a low frictional road surface, such as wet or icy roads, even when a rear-wheel brake fluid pressure control is achieved by the fluid pressure control valve. During quick braking on a low frictional road surface, since the vehicle wheels become all locked, a braking distance would be increased.

SUMMARY OF THE INVENTION

It is, therefore, in view of the above disadvantages, an object of the present invention to provide a brake control system employing a conventional fluid pressure control valve for controlling a brake fluid pressure distribution between front and rear wheels, which is capable of reliably preventing a rear-wheel lock without an expensive anti-skid brake control system.

It is another object of the invention to provide a brake control system employing a conventional fluid pressure control valve for controlling a brake fluid pressure distribution between front and rear wheels, which is capable of reliably preventing a rear-wheel lock even when brakes are quickly applied to the vehicle wheels on a relatively low frictional road surface.

In order to accomplish the aforementioned and other objects, a brake control system for preventing a rear-wheel lock in an automotive vehicle, comprises a fluid pressure control valve for controlling a brake fluid pressure distribution between front and rear wheels such that a rear wheel-cylinder brake fluid pressure is kept substantially constant in a range above a critical fluid pressure at which the brake fluid pressure distribution is essentially varied, means for monitoring a deceleration of the vehicle body, and means for increasing the critical fluid pressure in accordance with an increase in the deceleration only when the deceleration is increased.

According to another aspect of the invention, a brake control system for preventing a rear-wheel lock in an automotive vehicle, comprises a fluid pressure control valve for controlling a brake fluid pressure distribution between front and rear wheels such that a rear wheel-cylinder brake fluid pressure is kept substantially constant in a range above a critical fluid pressure at which the brake fluid pressure distribution is essentially varied and in addition a rear wheel-cylinder brake fluid pressure is set at a lower level than a front wheel-cylinder brake fluid pressure with the result that front-wheel lock gets priority over rear-wheel lock, means for monitoring a deceleration of the vehicle body, and means for increasing the critical fluid pressure in accordance with an increase in the deceleration only when the deceleration is increased.

The critical fluid pressure varying means sets the critical fluid pressure in the fluid pressure control valve at a given fluid pressure downwardly offsetting by a given offset value in consideration of pressure fluctuations in the fluid pressure control valve from a rear wheel-cylinder brake fluid pressure at which front and rear wheels are simultaneously locked while decelerations monitored by the deceleration monitoring means. The deceleration monitoring means includes a longitudinal acceleration sensor for monitoring a longitudinal acceleration of the vehicle body to generate a signal representative of the longitudinal acceleration. The deceleration monitoring means determines the deceleration on the basis of the signal from the longitudinal acceleration sensor.

DESCRIPTION OF THE PREFERRED EMBODIMENTS

Figure 1:
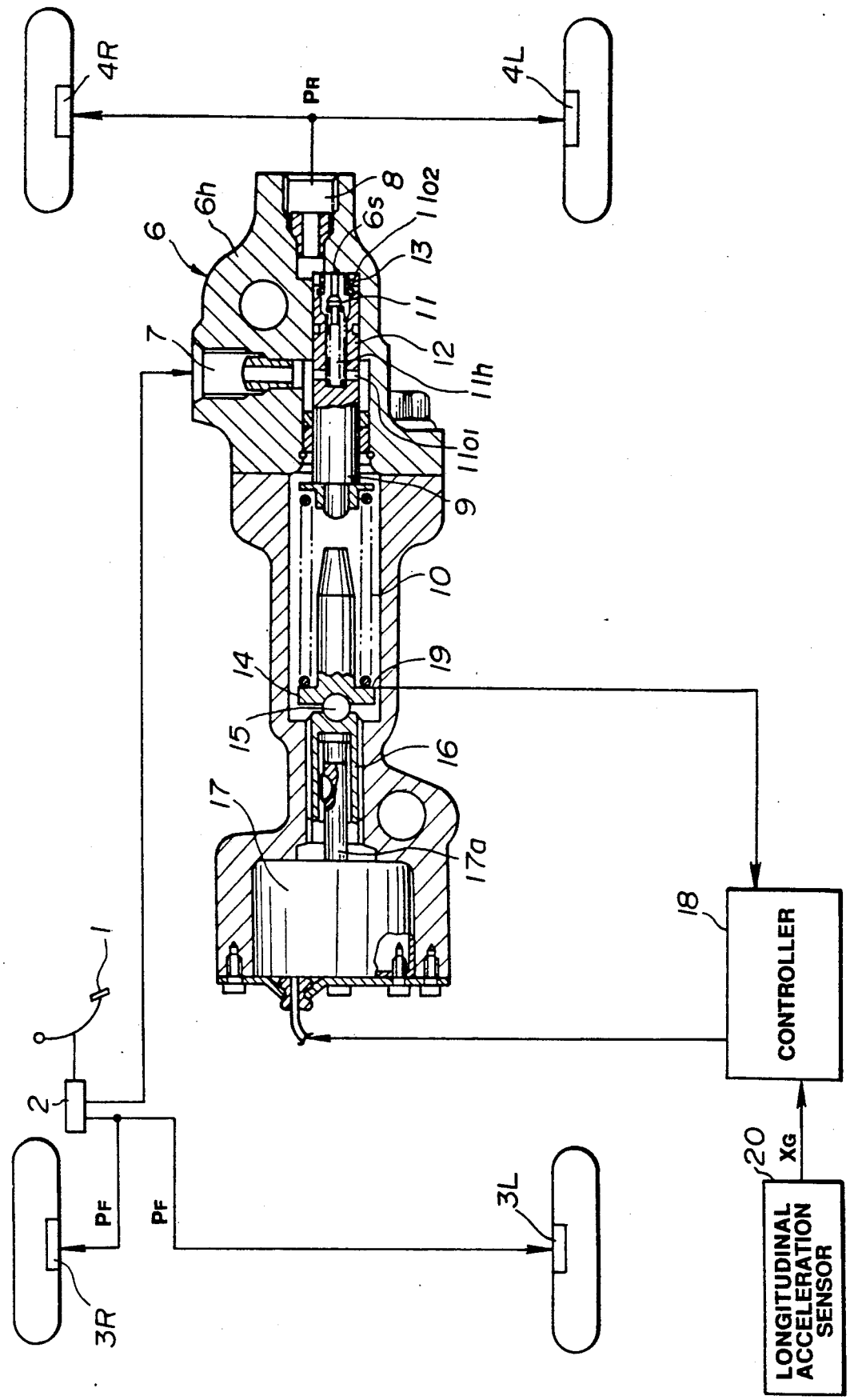
FIG. 1 is a schematic piping arrangement illustrating a preferred embodiment of an automotive brake control system for distributing braking forces applied to vehicle wheels.
Figure 2:
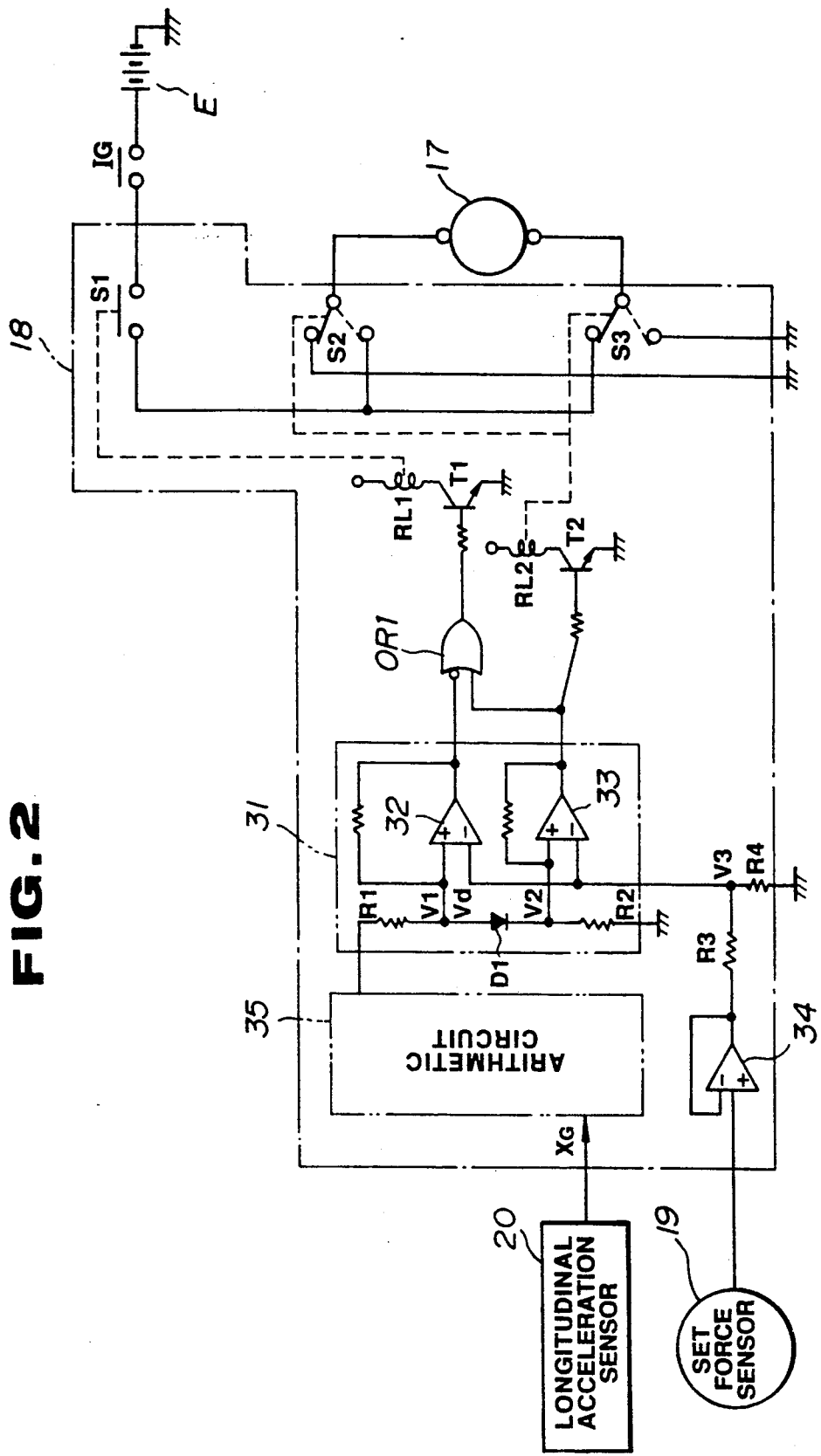
FIG. 2 is a circuit diagram illustrating a control circuit for activating a fluid pressure control valve disposed in the brake control system of FIG. 1 to control fluid pressure in rear wheel-cylinders.

Referring now to FIGS. 1 and 2, a brake control system according to the present invention comprises a tandem master cylinder 2 with two pistons (not shown) set in tandem and front-left, front-rear, rear-left and rear-right wheel-cylinders 3L, 3R, 4L and 4R, respectively. The master cylinder 2 generates fluid pressure proportional to a depressing force applied on a brake pedal 1. A master-cylinder fluid pressure forced by a first piston in the cylinder 2 is supplyed through a first outlet of the cylinder 2 to both front wheel-cylinders 3L and 3R as a brake fluid pressure $P_F$ for front wheel-cylinders, while the other master-cylinder fluid pressure forced by a second piston of the cylinder 2 is supplied through a second outlet of the cylinder 2 and a fluid pressure control valve 6 (as described in detail herebelow) to both rer wheel-cylinders 4L and 4R as a brake fluid pressure $P_R$ in rear wheel-cylinders.

In the rear-wheel brake fluid system, the brake control system of the present invention also includes a brake fluid pressure control valve 6 acting as a well-known proportioning valve or limiting valve. The fluid pressure control valve 6 receives the fluid pressure from the second outlet of the cylinder 2 through an inlet port 7 and outputs an adjusted fluid pressure serving as the brake fluid pressure $P_R$ through an outlet port 8 to the rear wheel-cylinders 4L and 4R. The fluid pressure control valve 6 includes a substantially cylindrical plunger 9 slidably disposed in a cylindrical hollow defined in its valve housing 6h, a return spring 10 biasing the plunger 9 towards a rightmost position (viewing FIG. 1) wherein a poppet valve seat 13 attached to the right end of the plunger mates with a shoulder 6s of the housing 6h, a poppet valve 11 slidably enclosed in a cylindrical hollow 11h bored in the plunger 9, and a return spring 12 operably enclosed in the hollow 11h for biasing the poppet valve 11 rightwards. The plunger also includes a first opening 11o1 formed in the small diameter section and a second opening 11o2 formed in the valve seat 13. As seen in FIG. 1, the inlet port 7 is communicated through the first opening 11o1, the hollow 11h and the second opening 11o2 with the outlet port 8.

Figure 4:
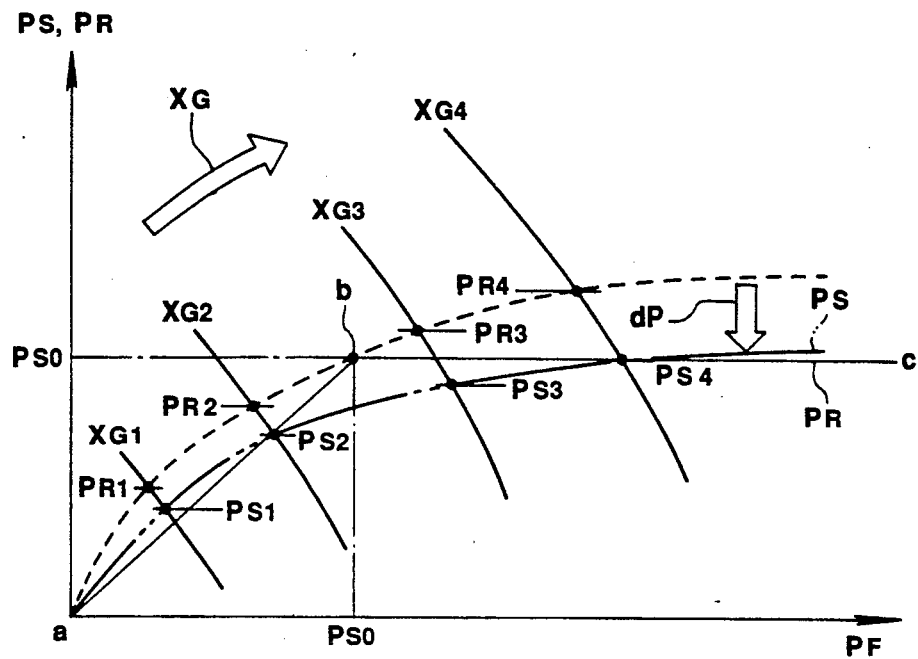
FIG. 4 is graphs illustrating control characteristics of a target critical fluid pressure set in the fluid pressure control valve and pressure distribution characteristics of fluid pressures in front and rear wheel-cylinders activated by the brake control system according to the invention.

In the rightmost position of the plunger 9 as shown in FIG. 1, the right end of the poppet valve 11 is pushed back by the shoulder 6s and therefore the poppet valve is slightly moved in a left direction while compressing the return spring 12. As a result, the poppet valve becomes apart from the valve seat 13 and thus the poppet valve is maintained in the open position. Under this condition, the two ports 7 and 8 are communicated to each other and thus the brake fluid pressure $P_R$ in the rear wheel-cylinder 4L and 4R becomes equal to the master-cylinder fluid pressure (corresponding to the brake fluid pressure $P_F$ in the front wheel-cylinder) fed through the second outlet of the cylinder 2. The above noted state of the fluid pressure control valve 6 occurs in a relatively low pressure range wherein the master-cylinder fluid pressure does not reach a critical fluid pressure $P_{S0}$ (depended on a set spring force of the return spring 10) as seen in FIG. 4. In this state, a brake fluid pressure distribution between the front and rear wheel-cylinders is varied in accordance with the fluid pressure characteristic curve a-b of FIG. 4, while keeping the pressure relationship of $P_F=P_R$.

The plunger 9 moves against the return spring 10 in the left direction in accordance with an increase in the master-cylinder fluid pressure. On the other hand, the poppet valve 11 mates with the valve seat 13 by means of the return spring 12 when the master-cylinder fluid pressure is gradually increased to the critical fluid pressure $P_{S0}$. Thus, the poppet valve 11 is closed. In the poppet-valve closed state, the poppet valve blocks a communication between the inlet port 7 and the outlet port 8. Therefore, a pressure-rise in the master-cylinder 2 is not transferred downstream of the plunger 9. Under the poppet valve closed state, even when fluid pressure in the master-cylinder 2 is subsequently increased in accordance with an increase in the depressing force applied on the brake pedal 1, the poppet valve 11 is maintained in a closed state and as a result the fluid pressure $P_R$ in the rear wheel-cylinders 4L and 4R is kept at the critical fluid pressure $P_{S0}$. In such a pressure range when the master-cylinder fluid pressure exceeds the critical fluid pressure $P_{S0}$ or the split point b, the brake fluid pressure distribution is varied in accordance with the pressure characteristic curve b-c of FIG. 4. That is. the fluid pressure control valve 6 operates in such a manner as to keep the rear wheel-cylinder brake fluid pressure $P_R$ substantially at the critical fluid pressure $P_{S0}$ when the master-cylinder brake fluid pressure exceeds the critical fluid pressure $P_{S0}$. The fluid pressure control valve of FIG. 1 exhibits the fluid pressure control characteristics (as seen in the solid line a-b-c of FIG. 4) substantially asymptotic to the ideal brake fluid pressure distribution characteristic curve indicated by the broken line.

The fluid pressure control valve employed in the brake control system according to the invention is different from the conventional fluid flow control valve in that a set spring force of the return spring 10 is variable and consequently the critical fluid pressure $P_{S0}$ (the split point b) is variable. For this reason, the fluid pressure control valve utilized in the improved brake control system of the present invention, includes means for changing the critical fluid pressure (i.e. the split point of a brake fluid pressure distribution characteristic curve). The split point changing means comprises an axially movable valve seat 14 supporting one end of the return spring 10, facing away from the left end of the plunger 9, an axially movable screw 16 being contact with the valve seat 14 through a ball 15, and a reversible motor or rotary solenoid 17 having a driving connection with the screw 16 through its output shaft 17a so as to achieve an axial movement of the screw 16. Both the magnitude and direction for driving the screw 16 are controlled by a controller 18 described in detail below. The controller 18 receives various signals generated from a set force sensor 19 monitoring the set spring force of the spring 10 and a longitudinal acceleration sensor 20 monitoring a longitudinal acceleration $X_G$ of the vehicle body. Since the magnitude of the longitudinal acceleration $X_G$ is correlated to a deceleration of the vehicle, the deceleration is determined on the basis of the longitudinal acceleration $X_G$. As shown in FIG. 2, the controller 18 comprised of a control circuit for controlling the motor 17 employed in the fluid pressure control valve 6 on the basis of the input informations from the sensors 19 and 20.

Referring now to FIG. 2, one terminal of the motor 17 is connected through a switching section S2 of an electromagnetic relay, a switching section S1 of an electromagnetic relay and an ignition switch IG to a positive terminal of a car battery E, in that order. On the other hand, the other terminal of the motor 17 is connected to through a switching section S3 of an electromagnetic relay, the switching section S1 and the ignition switch IG to the positive terminal of the car battery E, in that order. As is evident from FIG. 2, both switching sections S2 and S3 are provided to switch the rotational direction of the motor. The switching section S1 is a normally open type switch which is closed only when an exciting coil RL1 is excited. The respective switching sections S2 and S3 are shifted from first positions indicated by solid lines to second positions indicated by broken lines so as to change a flow direction of current flowing through the motor and consequently to reverse the rotational direction of the motor only when an exciting coil RL2 is excited. One terminal of each exciting coil RL1 and RL2 is connected to the positive terminal of the battery E, whereas the other terminal of each exciting coil is grounded through a collector-emitter of each transistor T1 and T2. A base of the transistor T1 is connected to an output terminal of an OR gate OR1, while both a base of the transistor T2 and two input terminals of the OR gate are connected to a comparing circuit 31.

The comparing circuit 31 comprises two comparators 32 and 33, two resistances R1 and R2, and a diode D1. The resistances R1 and R2 are arranged in series to each other in a manner so as to sandwich the diode D1 between the resistances R1 and R2, as seen in FIG. 2. A line between the resistance R1 and the diode D1 is connected to the positive input terminal of the comparator 32, while a line between the resistance R2 and the diode D1 is connected to the positive input terminal of the comparator 33. The other end of the resistance R2 is grounded. Both negative input terminals of the comparators 32 and 33 are connected to an intermediate line between two resistances R3 and R4. The other end of the resistance R4 is grounded.

The resistance R3 is connected through an amplifier 34 to the set force sensor 19 to receive a voltage depended on the magnitude of a current set force of the return spring 10. On the other hand, the resistance R1 receives an output voltage depended on a desired target critical fluid pressure for the fluid pressure control valve 6 for the rear wheel-cylinders 4L and 4R. The output voltage is generated by an arithmetic circuit 35 which derives the target critical fluid pressure to be set in the fluid pressure control valve 6, on the basis of the signal from the longitudinal acceleration sensor 20. The output voltage from the arithmetic circuit 35 is divided by the resistances R1 and R2 in such a manner as to apply two different voltages V1 and V2 to the respective positive input terminals of the comparators 32 and 33. The voltages V1 and V2 respectively correspond to upper and lower limits of a controllable voltage required to determine a desired set force of the return spring 10, necessary to set the desired target critical fluid pressure for the fluid pressure control valve 6. The voltage V2 impressed on the positive input terminal of the comparator 33 is set at a lower level than the voltage V1 impressed on the positive input terminal of the comparator 32 such that the voltage V2 is offset from the voltage V1 by a voltage difference Vd corresponding to a hysteresis which is created by the diode D1 disposed between the resistances R1 and R2 so as to provide an acceptable voltage difference required for the comparison between the voltage V3 representative of the current critical fluid pressure actually monitored by the sensor 19 and the controllable voltage necessary to newly set the target critical fluid pressure. Thereafter, the voltages V1 and V2 are respectively compared with the voltage V3 by means of the comparators 32 and 33. The previously noted arithmetic circuit 35 basically derives a target critical fluid pressure $P_S$ to be set in the fluid pressure control valve 6 on the basis of the deceleration $X_G$ monitored by the sensor 20 in accordance with a data map shown in FIG. 4.

Figure 5:
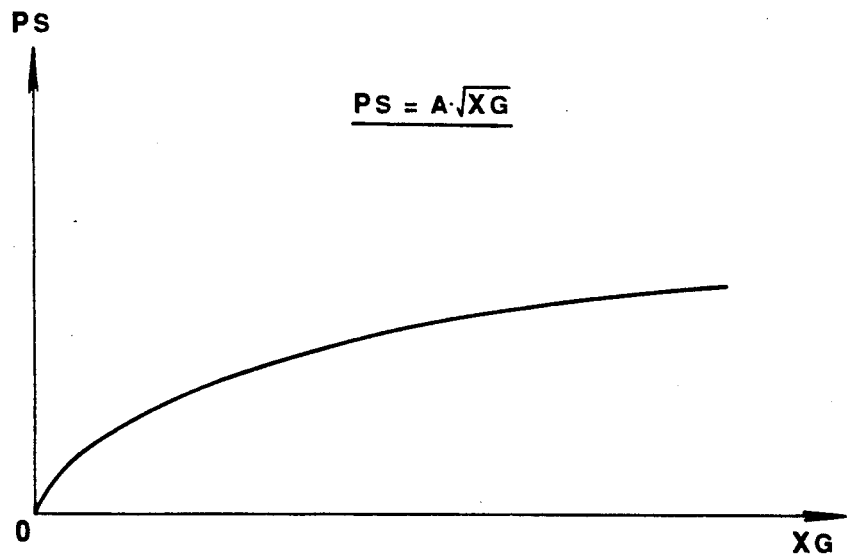
FIG. 5 is a graph illustrating a relationship between a deceleration $X_G$ of the vehicle and a target critical fluid pressure $P_S$ to be set in the fluid pressure control valve.

As appreciated from FIG. 4, in the brake control system according to the invention, the target critical fluid pressure $P_S$ is varied in response to various decelerating conditions of the vehicle. That is, as seen in the two-dotted line of FIG. 4, the target critical fluid pressures $P_S$ is set to the fluid pressures $P_{S1}$, $P_{S2}$, $P_{S3}$ and $P_{S4}$ downwardly offsetting by a offset value dP for every deceleration $X_{G1}$, $X_{G2}$, $X_{G3}$ and $X_{G4}$, for example, when compared with the rear wheel-cylinder brake fluid pressures $P_{R1}$, $P_{R2}$, $P_{R3}$ and, $P_{R4}$, respectively plotted on the ideal brake fluid pressure distribution characteristic curve indicated by the broken line. The offset value dP is provided in consideration of pressure fluctuations between an actually set critical fluid pressure and a target critical fluid pressure $P_S$ to be controlled by the fluid pressure control valve 6. In the embodiment, the offset value dP is determined to multiply each rear-wheel brake fluid pressure $P_{R1}$, $P_{R2}$, $P_{R3}$ and $P_{R4}$ by 30%. The offset value may be set at a constant value such that the target critical fluid pressure is set at a lower level than the rear-wheel brake fluid pressure plotted on the ideal brake fluid pressure distribution characteristic curve, irrespective of the previously noted pressure fluctuations of the critical fluid pressure. As seen in FIG. 5, the target critical fluid pressure characteristic curve (indicated by a two-dotted line in FIG. 4) can be asymptotic to a quadratic curve represented by an equation $P_S = A(X_G)^{\frac{1}{2}}$, wherein $P_S$, $A$ and $X_G$ are respectively a target critical fluid pressure, a given coefficient and a longitudinal acceleration essentially corresponding to a deceleration of the vehicle.

As appreciated from the above, the target critical fluid pressure $P_S$ is increased in accordance with an increase in deceleration $X_G$ while gradually reducing its pressure gradient and in addition kept at a lower pressure level than the rear wheel-cylinder brake fluid pressure plotted on the ideal brake fluid pressure distribution characteristic curve.

Returning to FIG. 2, the comparing circuit 31, the OR gate OR1 and the transistors T1 and T2 operate as follows.

As set forth above, the arithmetic circuit 35 determines a target critical fluid pressure $P_S$ of the pressure control valve 6. According to the data map as seen in FIG. 4, the target critical fluid pressure $P_S$ is increased from PS1, through PS2 and PS3 to PS4 while the deceleration $X_G$ is increased from $X_{G1}$ through $X_{G2}$ and $X_{G3}$ to $X_{G4}$, for example. In response to the target critical fluid pressure derived from the arithmetic circuit 35, voltages V1 and V2 are applied to the respective positive terminals of the comparators 32 and 33. The OR gate OR1 acts in conjunction with the comparators 32 and 33 to turn OFF the transistors T1 and T2 when the voltage V3 is equal to or less than the voltage V1 and is equal to or greater than the voltage V2, that is, $V2 \leq V3 \leq V1$, wherein the current critical fluid pressure is substantially equal to the target critical fluid pressure. Under this condition, since the current critical fluid pressure is essentially equivalent to the target critical fluid pressure, the turned-OFF transistor T1 acts to maintain the switching section S1 in its open state and the turned-OFF transistor T2 acts to maintain the switching sections S2 and S3 in the positions indicated by the solid lines of FIG. 2. As a result, the motor 17 is deactivated so that the set force of the return spring 10, and consequently the critical fluid pressure or the split point remain unchanged.

When the voltage V3 is less than the voltage V2 (V3 < V2), that is, the current critical fluid pressure is less than the target critical fluid pressure, the OR gate OR1 operates in conjunction with the comparators 32 and 33 to turn ON the transistors T1 and T2 such that the switching section S1 is closed state and the switching sections S2 and S3 are shifted to the positions indicated by the broken lines of FIG. 2. As a result, the motor 17 is driven in a normal rotational direction until the current critical fluid flow pressure is gradually increased and reaches the target critical fluid pressure while increasing the set force of the spring 10.

When the voltage V3 exceeds the voltage V1 (V3 > V1), that is, the current critical fluid pressure is greater than the target critical fluid pressure, the OR gate OR1 operates in conjunction with the comparators 32 and 33 to turn ON the transistor T1 and to turn OFF the transistor T2 such that the switching section S1 is closed and the switching sections S2 and S3 are maintained in the positions indicated by the solid lines of FIG. 2. As a result, the motor 17 is driven in a reverse rotational direction until the current critical fluid flow pressure is gradually decreased and reaches the target critical fluid pressure while decreasing the set force of the spring 10.

Figure 3:
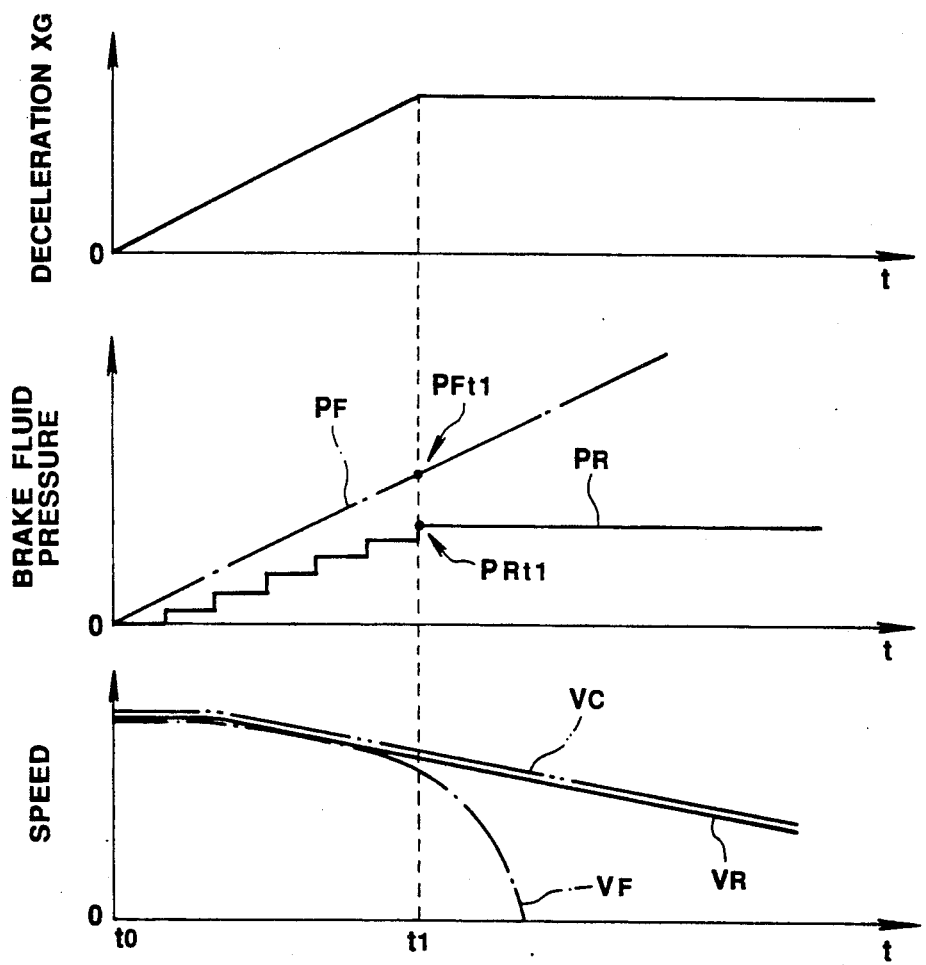
FIG. 3 is timing charts representing the operation of the brake control system according to the invention.

During braking, the brake control system of the present invention achieves a brake fluid pressure distribution in accordance with the timing charts of FIG. 3.

Referring now to FIG. 3, when the brake pedal is depressed at a time $t_0$, the front wheel-cylinder brake fluid pressure $P_F$ is increased and consequently the deceleration $X_G$ of of the vehicle body is also increased. As a result, a front-wheel speed $V_F$, a rear-wheel speed $V_R$ and a vehicle speed $V_C$ are all reduced. The arithmetic circuit 35 cyclically receives the signal representative of deceleration of the vehicle, output from the longitudinal acceleration sensor 20 at a given control period of time. Thereafter, the arithmetic circuit 35 cyclically determines a target critical fluid pressure on the basis of the input deceleration indicating signal in accordance with the data map of FIG. 4 and generates an output signal representative of the target critical fluid pressure. Thus, the critical fluid pressure in the fluid control valve 6, i.e., the rear wheel-cylinder fluid pressure $P_R$ is increased in a stepped fashion at the previously noted given control period of time as seen from a rear wheel-cylinder brake fluid pressure characteristics indicated in FIG. 3. Note that the rear wheel is not locked before the front wheel is locked, since the critical fluid pressure $P_S$ is downwardly set by the previously noted offset value, when compared with the ideal brake fluid distribution characteristic curve indicated by the broken line of FIG. 4.

Assuming that the front wheel becomes locked when the front wheel-cylinder fluid pressure $P_F$ is subsequently increased due to depressing of the brake pedal and reaches a fluid pressure $P_{Ft1}$ at a time $t_1$, a front wheel speed $V_F$ is rapidly reduced after the time $t_1$ and finally reaches 0. As a result, the deceleration $X_G$ of the vehicle is increased no more and kept substantially constant. Therefore, a pressure-rise in the critical fluid pressure $P_S$ is also stopped and the rear wheel-cylinder brake fluid pressure $P_R$ is kept at a constant value $P_{Rt1}$. In this manner, as soon as the brake control system according to the invention determines that an increase in the deceleration $X_G$ of the vehicle is stopped, that is, the front wheel starts to lock, on the basis of the deceleration indicating signal output from the longitudinal acceleration sensor 20, a pressure-rise in the rear wheel-cylinder brake fluid pressure $P_R$ is stopped and kept constant. Therefore, even when brakes are quickly applied to vehicle wheels on a relatively low frictional road surface, such as icy or wet roads, the vehicle speed $V_C$ is reliably decreased in accordance with a decrease in the rear wheel speed $V_R$ without a rear-wheel lock, as seen in FIG. 3. As set forth above, the brake control system of the invention provides a high driving stability and braking performance. On the other hand, since the conventional brake control system operates the pressure control valve in such a manner as to still approach the rear wheel-cylinder brake fluid pressure $P_R$ towards the reference critical fluid pressure $P_{S0}$ during quick braking on a low frictional road surface when the front wheel is locked at a lower front wheel-cylinder brake fluid pressure than the reference critical fluid pressure $P_{S0}$, the rear wheel may be locked subsequently to the front-wheel lock.

As will be appreciated from the above, it is advantageous to provide a brake control system according to the invention during quick braking under a relatively low frictional road condition wherein the vehicle experiences the front-wheel lock at a lower front wheel-cylinder brake fluid pressure than a reference critical fluid pressure.

While the foregoing is a description of the preferred embodiments for carrying out the invention, it will be understood that the invention is not limited to the particular embodiment shown and described herein, but may include variations and modifications without departing from the scope or spirit of this invention as described by the following claims.

What is claimed is:

1. A brake control system for preventing a rear-wheel lock in an automotive vehicle, comprising:
   a fluid pressure control valve for controlling brake fluid pressure distribution between front and rear wheels such that a rear wheel-cylinder brake fluid pressure is kept substantially constant after said rear wheel-cylinder brake fluid pressure reaches a critical fluid pressure;
   means for monitoring a deceleration exerted on said vehicle; and
   means for varying said critical fluid pressure in accordance with said deceleration such that critical fluid pressure varies in a non-linear fashion asymptotically to a given ideal brake fluid pressure distribution characteristic curve wherein said front and rear wheels are simultaneously locked, while keeping said critical fluid pressure at a level lower than said ideal brake fluid pressure distribution characteristic curve.

2. A brake control system as recited in claim 1, wherein said means for varying said critical fluid pressure sets said critical fluid pressure in said fluid pressure control valve at a fluid pressure which is downwardly offset from a rear wheel-cylinder brake fluid pressure indicated by said ideal brake fluid pressure distribution characteristic curve by an offset value which is based upon pressure fluctuations in said fluid pressure control valve.

3. A brake control system for preventing a rear-wheel lock in an automotive vehicle, comprising:
   a cut-off type fluid pressure control valve for controlling brake fluid pressure distribution between front and rear wheels, such that a rear wheel-cylinder brake fluid pressure is kept substantially constant after said rear wheel-cylinder brake fluid pressure reaches a critical fluid pressure so that front-wheel lock gets priority over rear-wheel lock;
   means for cyclically monitoring a deceleration exerted on said vehicle at a controlled cycle to generate a deceleration indicative signal; and
   means for varying said critical fluid pressure in accordance with said deceleration such that said critical fluid pressure varies in a non-linear fashion asymptotically to a given ideal brake fluid pressure distribution characteristic curve wherein said front and rear wheels are simultaneously locked, while keeping said critical fluid pressure at a level lower than said ideal brake fluid distribution characteristic curve by designating a ratio based on fluctuations in said rear wheel-cylinder brake fluid pressure generated by said fluid pressure control valve.

4. A brake control system as recited in claim 3, wherein said means for varying said critical fluid pressure sets said critical fluid pressure in said fluid pressure control valve at a fluid pressure which is downwardly offset from a rear wheel-cylinder brake fluid pressure indicated by said ideal brake fluid pressure distribution characteristic curve by an offset value which is based upon pressure fluctuations in said fluid pressure control valve.

5. A brake control system as recited in claim 4, wherein said deceleration monitoring means includes a longitudinal acceleration sensor for monitoring a longitudinal acceleration exerted on said vehicle to generate a signal representative of the longitudinal acceleration, said deceleration monitoring means determining said deceleration on the basis of said signal from said longitudinal acceleration sensor and wherein said means for varying said critical fluid pressure varies said critical fluid pressure in proportion to a square root of said deceleration.

* * * * *